April 19, 1960      M. L. DUFFY      2,933,203
AUTOMATIC WORK-POSITIONING DEVICE FOR MACHINE TOOLS Filed April 25, 1957      5 Sheets-Sheet 1

INVENTOR.
Marcus L. Duffy,
BY Loyal J. Miller
ATTORNEY

April 19, 1960  M. L. DUFFY  2,933,203
AUTOMATIC WORK-POSITIONING DEVICE FOR MACHINE TOOLS
Filed April 25, 1957  5 Sheets-Sheet 2

Marcus L. Duffy, INVENTOR.

BY Royal J. Miller
ATTORNEY

April 19, 1960

M. L. DUFFY 2,933,203

AUTOMATIC WORK-POSITIONING DEVICE FOR MACHINE TOOLS

Filed April 25, 1957

INVENTOR.
Marcus L. Duffy,
BY
Loyal J. Miller
ATTORNEY

FIG. 6B

United States Patent Office 2,933,203
Patented Apr. 19, 1960

2,933,203

AUTOMATIC WORK-POSITIONING DEVICE FOR MACHINE TOOLS

Marcus L. Duffy, Oklahoma City, Okla.

Application April 25, 1957, Serial No. 655,129

9 Claims. (Cl. 214—1)

The present invention relates to automatic work-positioning devices for machine tools, such as punch presses or the like, and more particularly to an electro-mechanical apparatus for automatically positioning a workpiece in a series of locations with respect to the punching element of a punch press, or similar machine, in response to a predetermined plan embodied in a coded tape or similar device associated with the apparatus.

It is conventional practice, in structural steel work, to punch holes through the web or flanges of structural steel beams, or the like, while the same is in the fabricating shop. These holes must be accurately located with reference to adjoining holes and co-operating structural components according to the predetermined plan in order that the adjacent adjoining structural elements may be readily connected therewith when assembling the structure on location. At the present time this punching operation is performed by means of a conventional punch press having a laterally projecting head or arbor which carries the punching element in co-operative alignment with a lower laterally extending base or support. An elongated horizontal track or spacing table having a series of transversely disposed rollers extends laterally of the punch head in perpendicular relation therewith for supporting an elongated section of structural steel or workpiece. Thus, the workpiece may be moved longitudinally of the track and transversely of the punch press head by means of the rollers for positioning the workpiece in selected locations under the punching element. The punch press stem holder or arbor is movable laterally of the track and workpiece for positioning the punching element when punching parallel rows of holes. The principal problem in such a structural steel punching operation resides in properly locating the workpiece for punching the holes in proper spaced relation to a base line reference point such as one end of the workpiece. One means of locating or positioning the workpiece has been to provide a gauger or measuring device at one longitudinal side of the supporting track. This gauger usually comprises an elongated strip of plate metal which is plurally perforated to form a series of transverse diagonally inclined rows of perforations by which feet, inches and certain increments of an inch may be calibrated. Pins or dowels are inserted into the perforations of the gauger and project upwardly thereabove. A suitable stop or bar carried transversely by the track in contact with one end of the workpiece projects laterally of the track above the gauger for contacting the pins therein and stopping the movement of the workpiece at selected locations as the same is moved longitudinally of the track. The punching element is then actuated for punching a hole at this location. Thereafter one or more of the pins must be removed from the gauger to permit the workpiece to be moved to contact the stop with the next pin. The principal objection to this method of positioning the workpiece lies in the fact that accurate fractional inch increments of measurements cannot be obtained because of the limitations of the spacing between the perforations which hold the stop pins. Furthermore such an arrangement requires the punch press operator to leave the press and remove the pins engaged by the stop at each punching location. While this is not so objectionable on relatively short workpieces, considerable valuable time is lost when processing structural steel workpieces which vary in length from twenty to forty feet or more.

It is therefore the principal object of the present invention to provide a novel and improved electro-mechanical work-positioning selector device which serves to automatically move a workpiece into a predetermined desired position with respect to a machine tool, such as a punch press.

An additionally important object is to provide a selecting device of this class comprising relatively simple components which are reliable in operation and will enable a sequence of different dimensions to be calibrated on a tape or similar means and fed into the selector for positioning a workpiece for a series of operations without the necessity of human supervision.

An additional object is to provide a device of this class by which increments of measurement may be calibrated to accurately position a workpiece for punching operations in contra-distinction to the conventional manner of using fixed measuring positions.

Another object is to provide a work-positioning selector device for operating mechanical components and automatically establishing each and every one of a series of different predetermined locations of the workpiece with respect to a punch-press, or the like, and including means for performing successive cycles of operation on the same workpiece.

Still another object of this invention is to provide an automatic position selecting device for controlling an improved spacing table by which the workpiece is moved with relation to a punch-press, or the like.

A further object of the invention is to provide a selector device which is adapted to be controlled by a perforated tape or similar signal recording means arranged for energizing a relay system and which is controllingly connected to the latter.

A still further object is to provide a position-selecting device which automatically returns the workpiece to starting position after completing a series of operational cycles.

A still further object of the invention is to provide an improved automatic position selector for controlling the movement of a rotary shaft which may be employed for any desired purpose, for example, establishing the position of a workpiece on a spacing table in connection with a punch-press or similar machine tool, the automatic selector being relatively simple in construction and providing accurate control of the shaft with which it is connected, and including means for automatically resetting the shaft to its starting position at the conclusion of a cycle of operations of the apparatus associated therewith.

The present invention accomplishes these and other objects by providing a spacing table adjacent to a punch press, or the like, with a movable carriage carried by the spacing table. The workpiece to be machined is moved by the carriage. A motor driven shaft is drivably connected to the carriage by means of a gear train and suitable chains and sprockets. An electrically responsive solenoid equipped selector mechanism has a rotatable shaft operatively connected to the motor driven shaft. An electrical relay bank energized by a coded tape, or the like, which is timed with the motor driven shaft by a rotary switch operates the solenoids to contact rotary arms carried by the selector mechanism for positioning the carriage and workpiece in a series of selected positions and actuating the punch-press.

Other objects will be apparent from the following description when taken in conjunction with the accompanying five sheets of drawings, wherein.

Like characters of reference designate like parts in those figures of the drawings in which they occur.

In the drawings.

Figure 1:
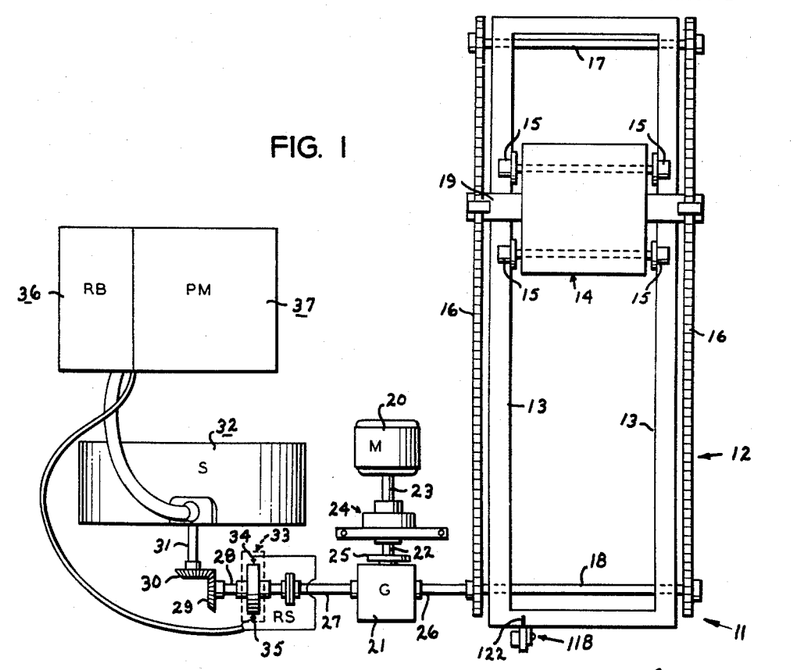
Figure 1 is a top plan view of an automatic spacing table and diagrammatically illustrating the arrangement of the apparatus associated therewith.

Referring more particularly to Fig. 1, the reference numeral 11 indicates, as a whole, a work-positioning apparatus adapted to be used in conjunction with a conventional punch press, not shown. The apparatus 11 comprises a workpiece supporting or spacing table 12 having a pair of elongated horizontally disposed guide rails or tracks 13—13 arranged in spaced-apart parallel relation on suitable supporting posts, not shown, for positioning the upper surface of the tracks 13—13 in cooperative alignment with the punching element of the punch press. The punch press is preferably situated at one longitudinal side of the table 12 so that the punch press head or arbor, not shown, may be disposed in spaced relation above and extend transversely across at least one of the tracks 13 in substantially right angular relation therewith. The spacing table 12, shown diagrammatically in the drawings, may be of any desired width or length and, in most instances, will preferably be extended so that its transverse width will be relatively narrow when compared with its length. A platform or carriage 14 is carried by the table 12 and is movable longitudinally therealong by means of two pairs of flanged wheels or rollers 15 journaled on transverse axles carried by the platform. The rollers are supported by the upper surface of the tracks 13 and the flanged edges of the rollers contact the inward edges of the respective tracks to guide the carriage or platform 14 in a mobile manner along the table 12 in response to electrical impulses, as is more fully explained hereinbelow. Respective endless sprocket chains 16—16 are provided at the opposing sides of the table 12. The chains are each engaged over sprocket wheels mounted on respective transverse shafts 17 and 18 journaled by the table at the opposite ends thereof. The carriage 14 is secured to the sprocket chains 16—16 as by means of a transverse connecting bar 19, whereby the carriage moves along the tracks 13—13 in accordance with the movement of the chains 16—16 actuated by the rotation of the driving shaft 18.

Carriage

The carriage 14 is adapted to support a workpiece, such as an elongated section of structural steel, or any other member in which holes are desired to be punched, and may be provided with suitable means for clamping the workpiece thereto so that the workpiece will be rigidly carried thereby as it is moved to respective different positions for punching holes therein. Alternatively, the carriage 14 may be utilized as a stop means against which one end of a workpiece is engaged while a hole is being punched therein. Thus, the forward edge of the carriage 14 serves as a reference point to establish a succession of locations for punching holes as the workpiece is moved longitudinally toward and beneath the punching element of a punch press. Regardless of the manner in which the workpiece is applied to the carriage 14, the carriage regulates the location of the holes punched in the workpiece, and by successively positioning the carriage 14 at different locations along the tracks 13—13 a series of spaced holes may be punched in the workpiece with the spacing between adjacent holes being regulated in accordance with the different successive locations of the carriage 14 with reference to the table 12.

It will readily be apparent that the carriage 14 may be positioned at different locations along the table 12 by rotating the drive shaft 18 through the different angles corresponding to the desired different locations of the carriage 14.

Power transmission

The shaft 18 is drivingly coupled to a reversible electric motor 20 and a reduction gear unit 21 whose input shaft 22 is coupled to the motor shaft 23 through a conventional electromagnetically operated clutch 24 which couples shaft 23 to shaft 22 in response to the energization thereof. A brake 25 is connected with the shaft 22 between the clutch 24 and the gear train 21. However, the electro-magnetic clutch 24 may be provided with a braking mechanism which is actuated when the clutch 24 is de-energized for stopping the rotation of the shaft 18, thus eliminating the necessity of the brake 25. Shaft 18 is gearingly coupled through the gear train 21 to a shaft 27, which is in turn coupled to a shaft 28 provided with a beveled gear 29. The beveled gear 29 meshes with a beveled gear 30 mounted on the lower end of a vertical shaft 31 of a rotary selector 32, more fully described hereinbelow. As stated above, the shaft 31 is preferably disposed vertically but has been angularly rotated 90° for clarity, with the attached selector 32 in diagrammatic drawing of Fig. 1, about the horizontal axis of the shaft 18. A rotary switch 33 is coupled to the shaft 28 and includes a pair of stationary contacts 34 and 35 and a conductor adapted to bridgingly engage these stationary contacts every half revolution of the shaft 28, for the purposes which will presently be apparent.

As will presently be explained in detail, the selector mechanism 32 controls the rotation of the shaft 31 and thus controls the rotation of the shaft 27 to establish the position to which the carriage 14 will be driven by the motor 20 through the shaft 18. The automatic selector member 32 is electrically controlled, comprising a plurality of plungers which are actuated by respective solenoids and which serve to limit the rotation of an arm element coupled to the shaft 31. The solenoids of the selector member 32 are selectively energized in accordance with the operation of a relay system contained in a relay bank 36. The relays in the relay bank 36 are selectively energized in accordance with signals provided by a pulse generating unit 37, in a manner presently to be described. The pulse generating mechanism is conventional, comprising, for example, a perforated tape with which is associated contact members or fingers and a conducting underlying member, so that the tape may be moved to present perforations beneath certain of the contact fingers and establish energization of selected relays in the relay bank unit 36 to thereby set up circuits for energizing selected solenoids in the selector unit 32, in a manner which will presently be explained in detail.

Selector unit

Referring now more particularly to Figs. 2, 3, 4 and 5, the selector unit 32, cylindrical in general configuration, is illustrated as comprising a stationary horizontal base 38 having a central aperture through which the vertical shaft 31 extends. The shaft 31 is journaled in a vertical sleeve member 39 secured at its lower end to the base 38 containing a pair of ball bearing units 40 at its respective upper and lower end portions for surrounding the shaft 31 at the respective ends of a circumferentially enlarged portion 41 of the shaft 31 and serving as bearings therefor. An elongated rectangular primary arm 42 is rigidly secured perpendicularly adjacent one end portion to the upper end portion of the shaft 31. The arm 42 extends horizontally outward from the shaft 31 a distance substantially one-half the radius of the plate 38. A sleeve member 43 loosely surrounds and is rotatably mounted on the stationary sleeve 39 by bearings 44 and 45 carried by enlarged bores adjacent the ends of the sleeve. The sleeve 43 is of substantial height and extends upwardly from a point adjacent the upper surface of the base plate 38 to a point adjacent but spaced below the arm 42. The sleeve 43 is held in place by a centrally bored nut 46 surrounding the shaft 31 and threadedly engaged with the upper end of the stationary sleeve 39 and contacting the upper end surface of the bearing 45. An annular plate 47 is axially secured to the lower end portion of the sleeve 43 in parallel spaced relation with the plate 38. A pair of annular plates 48 and 49 are axially secured in spaced apart parallel relation to the upper end portion of the sleeve 43. Diametrically the annular plates 47, 48 and 49 are substantially equal and describe a circumferential arc, when rotated, substantially equal with relation to the circumferential arc described by the arm 42 as it is rotated by the shaft 31. A plurality of rectangular secondary arms 50 are rigidly secured at one end portion between the plates 48 and 49 and extend radially outward equidistantly therefrom to describe a circumferential arc, when rotated, which is slightly less than the circumferential arc of the base plate 38. Designated by the numeral 51 is an annular plate or ring member which is rotatably supported parallel to the base plate 38 on bearing rollers 52 journaled in the base 38. The ring member 51 is disposed concentrically with the shaft 31, as shown, and is retained in concentric relationship with the shaft by the provision of flanged guide rollers 53 journaled by bolts 54 extended through the vase 38 and rotatably engaging the inner periphery of the ring member 51. The circumference of the ring member 51 is substantially equal with relation to the circumferential arc described by the rotation of the arms 50 and transversely the width of the ring 51 is substantially equal with relation to that portion of the arms 50 which project outwardly from the plates 48 and 49.

Figure 4:
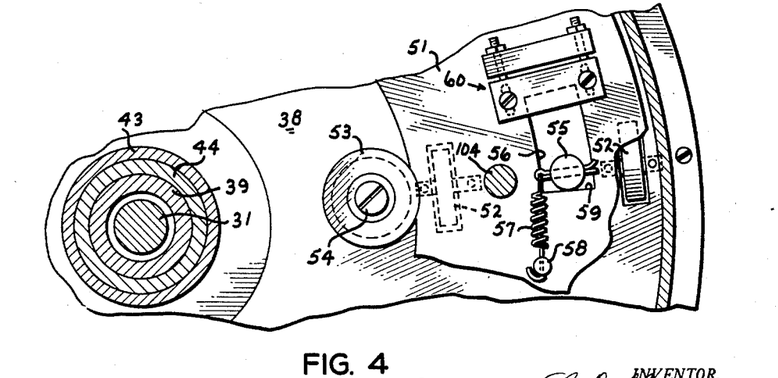
Figure 4 is a fragmentary horizontal cross sectional view taken substantially along line 4—4 of Figure 3.

As shown in Figure 4, an upstanding stop pin 55 is secured to the upper surface of the base 38 and projects vertically upward through an arcuate slot 56 formed in the annular plate member 51. A coiled spring 57 has one end thereof secured to the upper end portion of the stop pin 55 and its opposite end connected to a pin 58 on the upper surface of the plate member 51, biasing the plate counterclockwise, as viewed in Fig. 4, namely to a position within the end edge 59 of the slot 56 abuts the stop pin 55. Indicated by the numeral 60 is a stop block which is adjustably secured to the upper surface of the plate member 51 at the end of the slot 56 opposite the spring 57, as shown, to limit the clockwise rotation of the plate member 51, as viewed in Fig. 4.

Figures 2, 5:
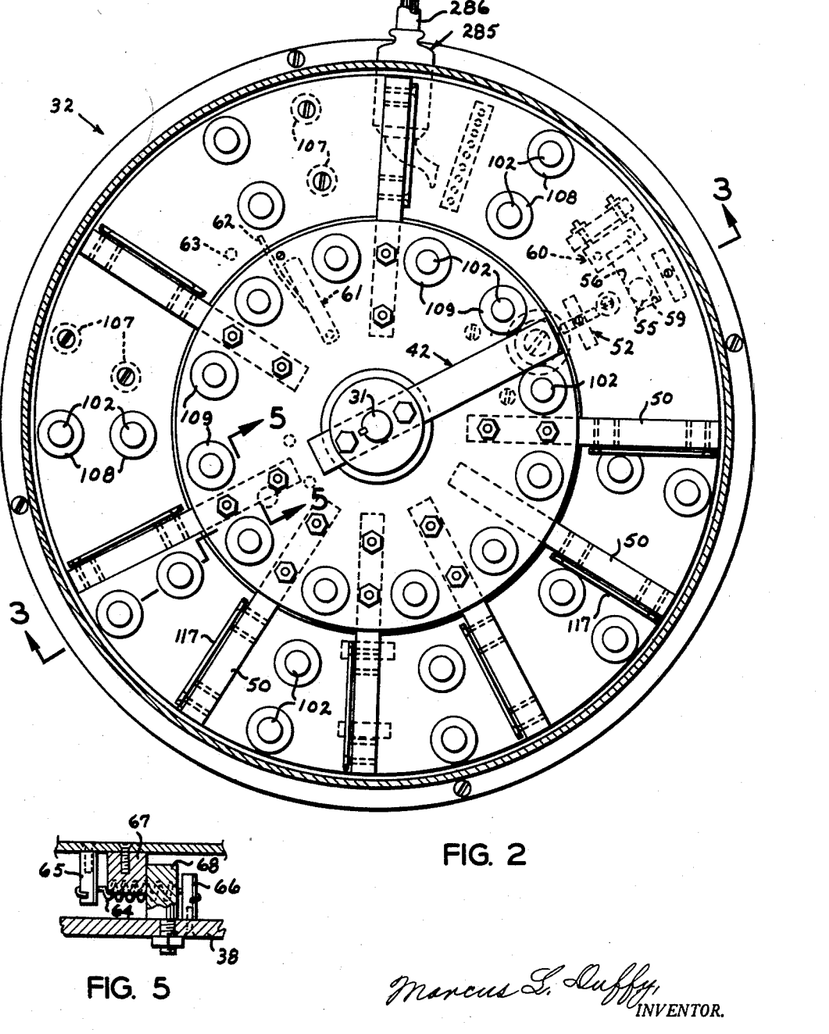
Figure 2 is a horizontal cross sectional view taken through the automatic selector member of the apparatus of Figure 1, said view being taken substantially along line 2—2 of Figure 3.
Figure 5 is an enlarged cross sectional detail view taken substantially along the line 5—5 of Figure 2.

As illustrated in Fig. 2, a micro switch 61 is secured to the base 38 inwardly of the ring member 51. The micro switch 61 normally remains closed and includes an operating arm 62 which projects outwardly below the ring member 51 for engagement with a depending pin 63 secured to the under surface of the member 51 when the member 51 is rotated clockwise, as viewed in Fig. 2, against the biasing force of the spring 57, whereby the micro switch 61 is opened.

As will presently be explained, the bottom plate 47, the top plates 48 and 49, with the sleeve 43, and including the arms 50, comprise a first rotor assembly which is rotatable clockwise, as viewed in Fig. 2, from a normal position towards which it is biased by a spring 64 (Fig. 5) connecting a depending pin 65 secured to the lower surface of the plate 47 to an upstanding pin 66 vertically secured to the upper surface of the base 38. Secured to the lower surface of the plate 47 is a depending stop block 67 which is engageable with an upstanding stop pin 68 rigidly carried by the base 38 for establishing a normal position of the rotor assembly with respect to the base 38.

Figure 6A:
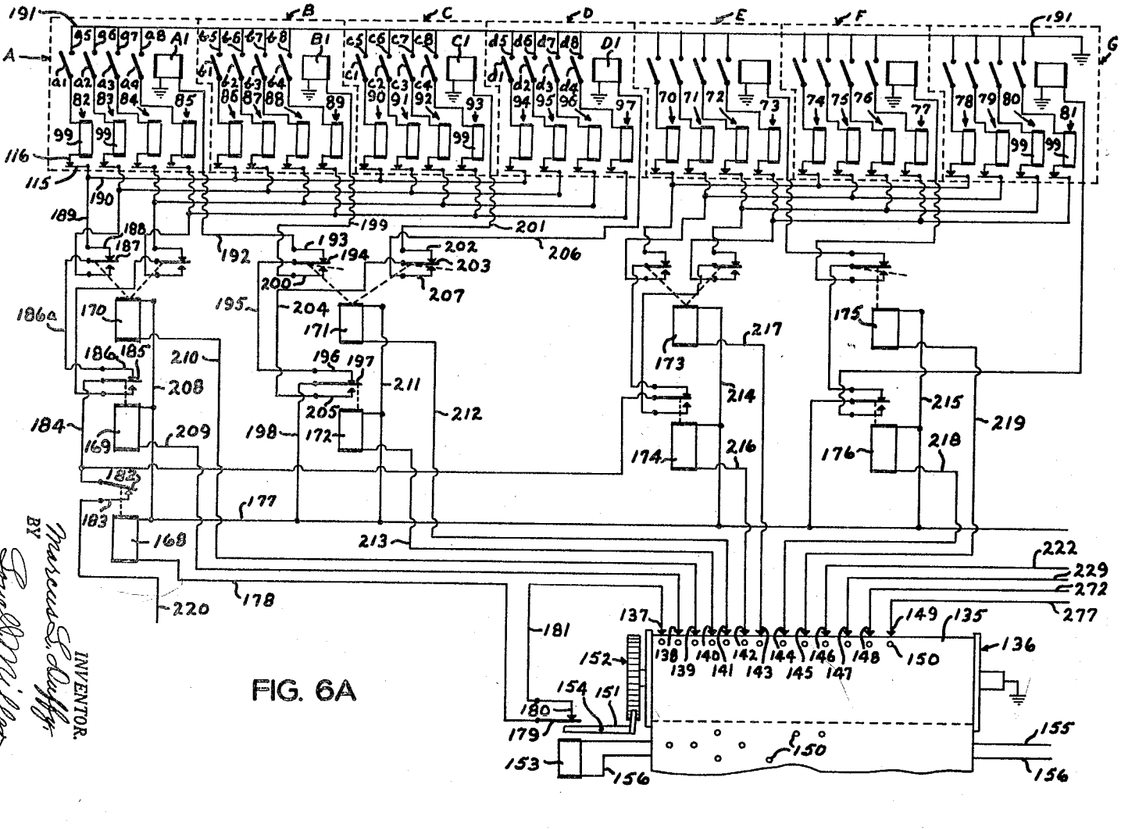
Figure 6A is a circuit diagram illustrating a portion of the electrical connections of the automatic work-positioning selector means of Figure 1.

A plurality, preferably comprising twelve in number, of solenoid units, indicated in Fig. 6A by the numerals 70 to 81, inclusive, are vertically mounted on the upper surface of the plate member 47 adjacent its outer periphery in circumferentially equally spaced-apart relation. Mounted on the upper surface of the ring member 51 are sixteen similar solenoid units numbered 82 to 97, inclusive, in Fig. 6A. The solenoids, 82 to 97, are arranged in two circumferential rows of eight each and form eight pairs of radially aligned solenoids with respect to the axis of the shaft 31.

Figure 3:
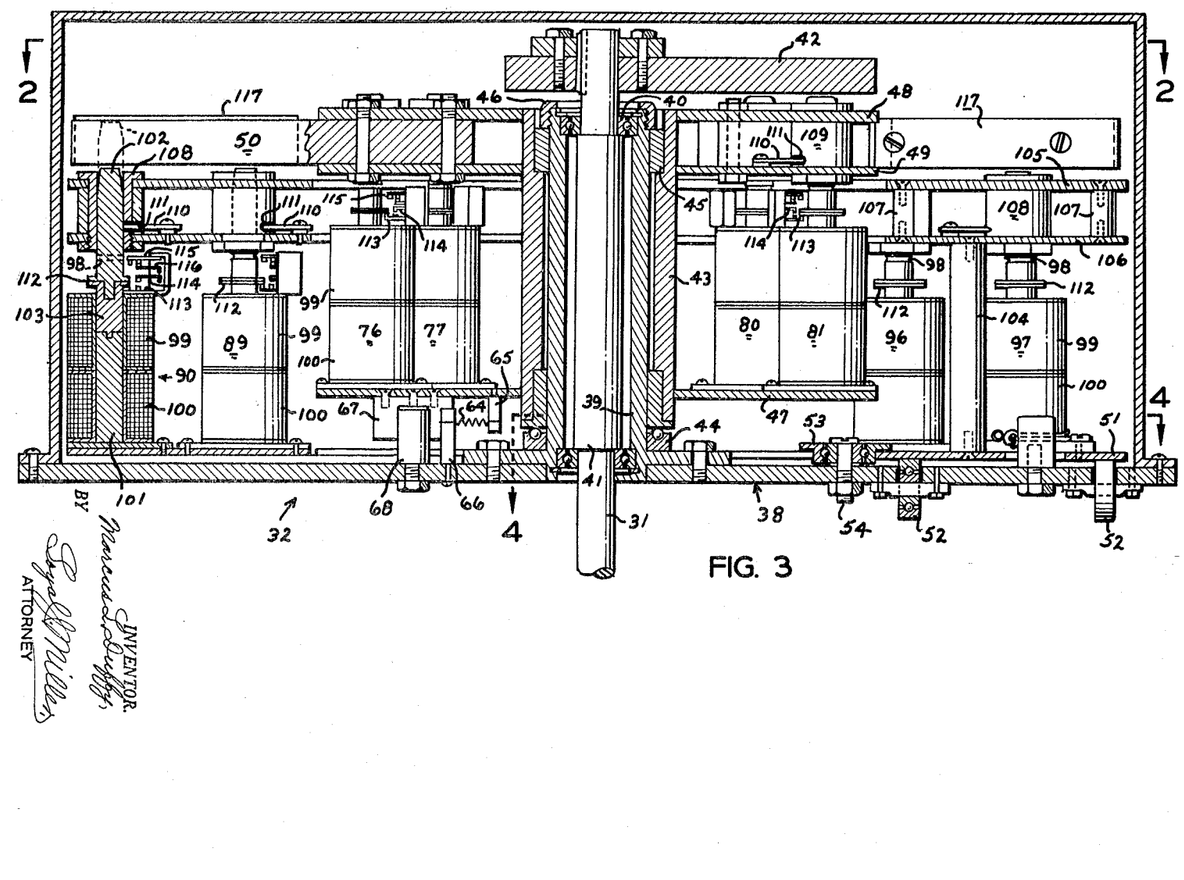
Figure 3 is a vertical cross sectional view taken substantially along line 3—3 of Figure 2.

The solenoid units, 70 to 97, inclusive, are each identical in more or less conventional construction, each unit comprising an upper winding or coil 99 and a lower winding or coil 100, as illustrated in Fig. 3. Contained in each solenoid unit is a core or plunger element comprising a lower magnetic metal portion 101 and a magnetic metal upper portion 102 which are joined by an intermediate nonmagnetic section 103 of metal or other suitable material. Secured to the ring member 51, by a plurality of vertical posts 104, is a superstructure comprising a pair of parallel annular plate-like ring members 105 and 106 secured together in parallel spaced-apart relationship by suitable spacer bars 107. A respective plurality of sleeve assemblies 108 extend between the two plates 105 and 106 through respective co-operating perforations for slidably receiving freely the upper core portions 102 of the solenoid units 82 to 97, inclusive.

Similarly sleeve assemblies 109 are similarly extended between the plates 48 and 49 through co-operating perforations adjacent their peripheries in co-operative alignment with the respective plunger elements 102 of the solenoid units 70 to 81 inclusive.

As shown by dotted lines in Fig. 3, the upper plunger portions 102 of the solenoid units 82 to 97, inclusive, will extend above the top of the superstructure plate 105 a substantial distance when the upper coil 99 is energized, and thus the plunger will extend into the path of the movement of the arms 50. The upper portion 102 of each respective solenoid plunger of the solenoid units 70 to 97, inclusive, is formed with an annular groove 98 intermediate its ends which is lockingly engageable by a spring arm 110 secured to the plate member adjacent thereto and extending through a slot 111 formed through the wall of the respective sleeve assembly 108, whereby the plunger will be automatically and yieldably locked in raised or elevated position whenever the upper coil 99 of the respective solenoid is energized. Thus, the plunger assembly will be retained in elevated position when the coil winding is de-energized and remains in this position until the lower coil winding 100 is energized which has sufficient electro-magnetic attraction to overcome the holding force of the spring finger 110 and draw the plunger assembly downward to its inactivated position, shown by the solid line position in Fig. 3.

Each solenoid plunger assembly is formed with an annular flange 112 adjacent the lower end of the upper portion 102 which is disposed adjacent the upper end surface of the respective solenoid when the same is de-energized. The flange 112 is engageable with the lowermost one of a pair of switch arms 113 and 114, carried by the solenoid, to separate the contact points of these arms when the plunger assembly is in its lower position, as shown by solid lines in Fig. 3. The flange 112 is further engageable with the uppermost one of a second pair of switch arms 115 and 116, similarly carried by the respective solenoid, when the plunger assembly is elevated in response to the energization of the upper coil 99, as disclosed hereinabove. Thus, when the plungers 102 are in their normal positions, their associated switch arms 113 and 114 are separated and their associated switch arms 115 and 116 are in contact with each other. Conversely, when the plunger assemblies are in their elevated positions, their associated switch arms 115 and 116 are separated from each other and their associated switch arms 113 and 114 are in contact with each other. As will presently be explained the separation of the switch arms 115 and 116 opens the circuit of the upper coil winding 99 to de-energize the same responsive to the elevation of the associated plunger assembly. The associated switch arms 113 and 114 close, preparing a cancelling circuit for energizing the lower solenoid winding 100 at an appropriate point in the operation cycle and restoring the plunger assemblies to their lower positions.

Obviously the bracket mounting the respective pairs of switch arms 113—114 and 115—116 must be suitably insulated electrically from contact with the respective solenoid. The solenoid units 70 to 81, inclusive, are spaced around the path of the rotative movement of the arm 42 to represent increments of one inch of movement of the carriage 14 along the spacing table 12. Thus, the gear train 21 establishes the proper relationship between the rotation of the shaft 18 and the rotation of the shaft 31 so that the rotation of the shaft 31 through one twelfth of a revolution rotates the shaft 18 through the correct angle to move the carriage 14 one inch along the spacing table 12. Thus, energization of the upper coil of a selected solenoid unit 70 to 81, inclusive, elevates its plunger assembly to obstruct the rotation of arm 42 at a point corresponding to a selected inch value in the movement of the carriage 14 along the spacing table 12.

Similarly, the solenoids 82 to 97, inclusive, are spaced with relation to the arms 50 to correspond to respective fractional inch values, for example, respective sixteenth-of-an-inch values in terms of angular movement of the shaft 31 with respect to the movement of the carriage 14. Referring to Fig. 2, the outer solenoid units 82 to 97, inclusive, are spaced angularly around the axis of the shaft in a manner such that the elevated top plunger element 102 of a selected solenoid of units 82 to 97, inclusive, will be engaged by one of the eight radially extending arms 50 employed in the illustrated embodiment of the invention at an angular position of the shaft 31 corresponding to a predetermined sixteenth inch value. Such engagement with occur subsequent to the engagement of the arm 42 with the elevated top plunger element 102 of a selected inch value solenoid unit 70 and 81, inclusive. As will be readily apparent when the arm 42 engages the elevated plunger element 102 of the selected solenoid inch value solenoid units 70 to 81, inclusive, torque is transmitted from the arm 42 to the elevated plunger element and thence to the rotor assembly comprising the plates 47, 48 and 49, and thus rotates the radially extending arms 50. The rotor assembly and the arms 50 rotate clockwise, as viewed in Fig. 2, until one of the arms 50 engages the upstanding plunger element 102 of a selected sixteenth inch value solenoid unit 82 to 97, inclusive.

As shown in Fig. 2, each arm 50 is further provided with an adjustable bar 117 adapted to abut the upstanding plunger element 102 of the selected solenoid unit 82 to 97, inclusive. The lateral adjustment of each respective bar 117 with relation to the face portion of each respective arm 50 permits corrective adjustments of the fractional inch measurements between the arms 50 and the respective solenoid plungers 102 in properly positioning the carriage 14 along the track 12.

When an arm 50 engages a selected elevated plunger element 102 at its abutment bar 117, clockwise torque, as viewed in Fig. 2, is transmitted to the annular ring member 51 causing the ring to rotate clockwise and thus causing its pin 63 to engage the operating arm 62 of the normally closed micro switch 61, thus opening the switch. This de-energizes the motor 20, as will presently be explained, and initiates further steps in the cycle of operation of the apparatus.

When the selected solenoid units are returned to their normal conditions by the energization of the lower coil windings 100, in a manner to presently be explained, their plunger assemblies are lowered, releasing the arms 42 and 50, and allowing the biasing springs 57 and 64 to return the plate member 51 and the rotor comprising plates 47, 48 and 49 to normal positions, wherein the stop pin 55 is in abutment with the end edge 59 of the slot 56 and the depending block 67 is in abutment with the upstanding stop pin 68. The return of plate member 51 to its normal position causes pin 63 to be moved from engagement with the micro switch arm 62, allowing the micro switch 61 to close.

*Punch press connections*

Referring to Fig. 1, the numeral 118 indicates a normally open pawl-operated rotary switch which is mounted on the table 12 adjacent the shaft 18. The switch 118 comprises a rotary arm 119, shown diagrammatically in Fig. 6B, and engageable successively with angularly spaced contacts 120. The contacts 120 are electrically connected with a common conductor 121. The switch arm 119 is normally disengaged from the contacts 120, but makes intermittent contact therewith when the switch arm is rotated. The switch arm 119 is rotated by a pawl 122, see Fig. 1, engaging suitable ratchet means, not shown, on the switch, the ratchet means being mechanically coupled to the switch arm 119 so that the rotation of the switch arm through an angle is equal to the angle between successive contacts 120 each time the pawl 122 is actuated. The pawl is actuated by the engagement of the carriage 14 therewith when the carriage is returned to its starting position on the table 12. Thus, the switch 118 comprises a normally open single pole switch which is momentarily closed when the carriage 14 returns to its starting position. The pawl 122 may be mounted in any suitable bracket means arranged to guide the pawl for sliding movement and into engagement with the ratchet wheel of the switch 118 when the pawl is actuated by contact of the carriage 14 therewith. The ratchet wheel of the switch 118 is connected to the switch arm 119 in any suitable manner for providing momentary contact of the arm with one of the stationary contact members 120 wherever pawl 122 is actuated.

Indicated diagrammatically at 123 (Fig. 6B) is a plunger member which is a portion of or is mechanically connected with or mounted on the moving punching element of the punch press with which the apparatus is employed. Obviously, when the apparatus of the instant invention is employed with a machine tool other than a punch press, the plunger 123 will necessarily be coupled to the machine in a manner to provide reciprocating motion for the plunger 123.

Mounted on the plunger 123, and suitably insulated therefrom, is a first conductive band 124 normally engaging and conductively bridging a pair of stationary contacts 125 and 126 mounted adjacent the plunger 123. A similar band 127 is mounted on and insulated from the plunger 123 in spaced relation with the band 124 in the manner shown diagrammatically in Fig. 6B. The spacing between the bands 124 and 127 is governed by the desired travel of the punching element. The band 127 is adapted to conductively engage and bridge a second pair of stationary contacts 128 and 129 mounted on a suitable support adjacent the plunger 123 responsive to the movement of the plunger to the lowermost point of its stroke. In this position the conductive band 124 is engageable between and bridges a third pair of contacts 130 and 131 carried by the same support for the contacts 125—126 and 128—129.

The plunger 123 is biased upwardly toward its uppermost position and is normally thus elevated when the punching element of the punch press, not shown, is in an inactivated position. The punch press is activated for releasing the punching element in performing a hole punching stroke responsive to the energization of a tripping solenoid 132. Solenoid 132 is normally de-energized. When solenoid 132 is energized it trips the punch press and releases the punching element, whereby the plunger 123 descends therewith, and whereby contacts 125 and 126 are disconnected and contacts 130 and 131 are bridged by the band 124. Likewise contacts 128 and 129 are bridged by the lower band 127.

Electrical connections

Figure 6B:
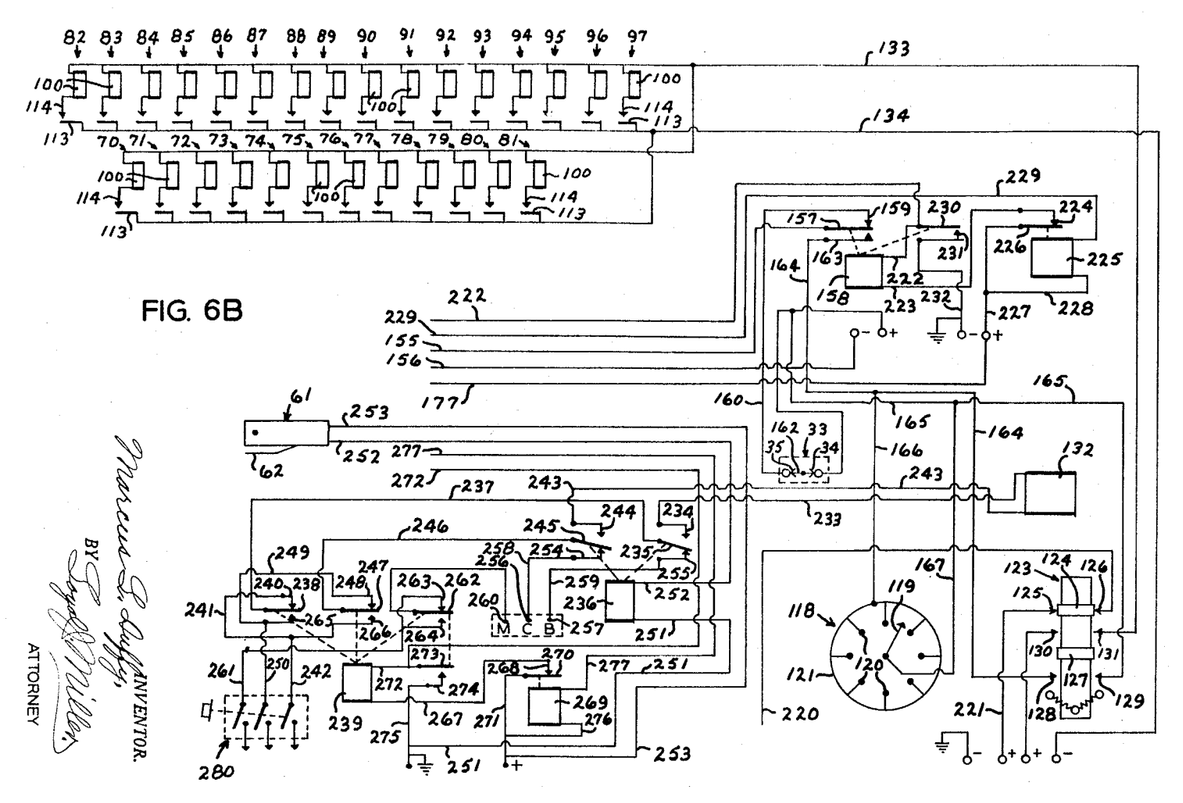
Figure 6B is a circuit diagram illustrating the remaining electrical connections of the selector means of Figure 1.

The respective plunger assembly retracting coil windings of each respective solenoid unit 70 to 97, inclusive, are connected through their normally open associated contacts 113 and 114 to a pair of wires or conductors 133 and 134 (Fig. 6B). The wire 134 is connected to the negative terminal of a suitable D.C. source of energizing current for activating the solenoids. The direct current source may be obtained in any conventional manner as by a full-wave rectifier connected to an alternating current. The wire 133 is connected with contact 131. Contact 130 is connected with the positive terminal of the current source. Thus, when the plunger is moved downwardly, accompanying a punching stroke of the punch press, the contacts 130 and 131 are bridged, energizing any of the coil windings 100 whose contacts 113 and 114 are closed by reason of the solenoid plunger core or plunger assembly being raised.

As explained hereinabove, when any of the upper windings 99 of the solenoid units 70 to 97, inclusive, are energized, the plunger assemblies associated therewith are elevated to raise their top portion 102 into obstructing relationship with respect to the arms 42 and 50. This opens the associated contacts 115 and 116, de-energizing the upper windings 99, and the pin or plunger elements 102 are locked in elevated positions by their associated spring arms 110. At the same time the lower contacts 113 and 114 close since they are disengaged from the flanges 112. Thus, the lower windings 100 of the selected solenoid units are prepared for energization, and become energized as soon as the band 124 bridges the contacts 130 and 131. This causes the elevated plunger assemblies to be lowered to their normal positions and the energizing circuits for the lower coil windings 100 being automatically opened as the downwardly moving flanges 112 engage and open the contact arms 113 and 114. Thus, each of the plungers which have been elevated are automatically lowered responsive to the punching stroke of the machine or press and are reset for a succeeding selection.

Selection of the upper coil windings of the solenoid units 70 to 97, inclusive, to be energized, is accomplished by means of a code perforated tape 135 carried by a rotary drum 136 with the surface of the tape being engaged by a plurality of contact fingers 137 to 149, inclusive, spaced in the manner diagrammatically shown in Fig. 6A and adapted to make contact with the conductive periphery of the drum 136 through the non-conductive tape by means of apertures 150 provided in the tape in accordance with a predetermined plan or code. The tape 135 may be connected to or carried by the drum 136 in any conventional manner presently in use permitting positive rotation of the tape with the drum. For relatively short lengths of workpieces the tape may only equal the circumference of the drum 136, but in fabricating an elongated section of steel the tape may extend laterally outward from the drum and be joined together at its ends to form a loop extending around an idler roller, not shown. Thus, the drum 136 will move the tape 135 through one revolution of the tape to pass a cycle of the coded perforations 150 beneath the fingers 137 to 149. The punching element of the punch press may then be moved laterally of the workpiece, as is conventional, and the same coded tape 135 recycled by the drum for punching an identically located set of holes in spaced-apart relation to those previously punched. Similarly, the same tape may be used repeatedly for positioning additional workpieces which are to have holes punched in similar locations. The frame of the drum 136 is electrically connected to ground as indicated in Fig. 6A.

The drum 136 is rotated by a pivoted pawl member 151 which is engageable with a ratchet wheel 152 rigidly secured to the shaft of the drum 136. The pawl member is actuated by a solenoid 153 which is normally de-energized and which pivots the pawl member on its fulcrum point 154 in a manner to advance the drum through a predetermined angular step responsive to the energization of the solenoid 153. Suitable spring means, not shown, returns the pawl 151 to its starting position whenever the solenoid is de-energized, thus positioning the pawl for a successive engagement with the ratchet wheel 152 for the next energization of the solenoid 153.

Connected to the terminals of the tape feed solenoid 153 are respective conductor wires 155 and 156. Wire 156 is connected to the negative terminal of a suitable current source, as shown in Fig. 6B. Wire 155 is connected to one of the armatures 157 of a double pole relay 158. The armature 157 in the de-energized condition of relay 158 engages a stationary contact 159 of relay 158. Contact 159 is connected by a wire 160 to the stationary contact 35 of the rotary switch 33. The other stationary contact 34 of the rotary switch 33 is connected to the positive terminal of the current source. Therefore, with relay 158 de-energized, as shown, the solenoid 153 will receive two pulses for each and every rotation of the shaft 31, since the rotary arm of the switch, shown at 162, will bridge the contacts 34 and 35 of the rotary switch twice during every revolution of the shaft 31, in as much as shaft 31 is coupled to the shaft 28, for simultaneous rotation therewith.

When the relay 158 is energized, its armature 157 engages a lower contact 163. In this condition of the relay 158 the tape feed solenoid 153 will be energized responsive to the punching stroke of the plunger 123 by a circuit comprising the negative terminal of the current source, wire 156, armature 157, lower contact 163, a wire 164 connecting contact 163 to contact 128, the conducting band 127, contact 129 and a wire 165 connecting contact 129 to the positive terminal of the current source. Thus, the tape is advanced automatically responsive to the downward movement of the punch actuated plunger 123.

The rotary switch 118 is electrically connected in parallel with the contacts 128 and 129, the conductor 121 being connected to wire 164 by a wire 166, and the switch arm 119 being connected to the wire 165 by a wire 167. Therefore, the tape 135 is automatically advanced one step responsive to the movement of the carriage 14 towards the punch press since the movement of the carriage actuates the pawl member 122 of the rotary switch 118.

Relay Bank

Selection of the upper coil windings 99 of the respective solenoid units 70 to 97, inclusive, is accomplished by means of a conventional relay tree accompanied by the binary code. The selecting circuit being controlled by the coded tape 135 and by the contact fingers 137 to 149 engageable with the drum 136 through the tape perforations. Thus, the relay tree arrangement employed to select the upper windings 99 of the solenoid units 70 to 97, inclusive, comprises the relays 168 to 176, inclusive, and the group selecting relays A to G, inclusive, which are capable of being energized in various combinations and which are connected in a well known conventional manner so that each specific combination will provide energization of either none or any one of the upper coil windings 99 to the solenoid units 70 to 81, inclusive, whereby an inch value may be selected and will provide energization of either none or any one of the coil windings 99 of the solenoid units 82 to 97, inclusive, whereby a sixteenth inch value may be selected.

The winding of the initial relay 168 of the relay tree arrangement is connected at one of its terminals to a wire 177 which is connected to the positive terminal of a suitable current source. The other terminal of relay 168 is connected by a wire 178 to an armature 179 controlled by the tape feed solenoid 153, the armature 179 normally engaging a stationary contact 180 when the solenoid 153 is de-energized, and disengaging therefrom, responsive to the energization of the solenoid 153, namely, simultaneously with the pivoting of the pawl 151 to advance the tape. Contact 180 is connected by a wire 181 to the contact finger 137, whereby the relay 168 will be energized when finger 137 engages the drum 136 through an aperture 150 in the tape and thus connects contact 137 to the negative terminal of the current source.

When relay 168 is energized, its armature 182 engages the stationary contact 183. Armature 182 is connected by a wire 184 to the armature 185 of relay 169 which normally is engaged with the upper contact 186 as shown. Contact 186 is connected by a wire 186a to one of the armatures 187 of the relay 170 which is normally engaged with an upper contact 188 associated therewith. The contact 188 is connected by a wire 189 to switch contact 115 associated with the upper coil winding 99 of the solenoid unit 82.

Solenoid unit 82 is the first of a group A comprising the four solenoid units 82, 83, 84 and 85. A second group B comprises the solenoid units 86, 87, 88 and 89. The upper coil winding 99 of the solenoid unit 86 is connected to a wire 190 through its normally closed contacts 115 and 116, as shown, which is in turn connected to the wire 189. A third group C comprises the solenoid units 90, 91, 92 and 93. The upper coil winding 99 of the solenoid unit 90 is connected through its normally closed switch contacts 115 and 116 to the wire 190. A fourth group D comprises the solenoid units 94, 95, 96 and 97. The upper coil winding 99 of the solenoid unit 94 is similarly connected through its normally closed switch contacts 115 and 116 to the wire 190. Thus, it may be seen that the coil winding 99 of the first unit of each of the four groups, namely A, B, C and D is connected through its energizing source through its normally closed contacts 115 and 116.

The upper terminals of the solenoid coil windings 99 of the group A, namely, units 82 to 85, inclusive, are each respectively connected to the respective armatures a1, a2, a3 and a4 of the group A selecting relay A1. The respective associated armature contacts of the selecting relay A1, namely, a5, a6, a7, and a8 are connected in parallel through the wire 191 to the common negative source of current or ground used for the solenoids 70 to 97, inclusive. The coil winding of group selector relay A1 has one of its terminal ends connected to a negative source of current or ground and its opposite terminal end connected by the wire 192 to the upper contact 193 of relay 171. The associated armature 194 of the relay 171 is connected by a wire 195 to the upper contact 196 of relay 172. The associated armature 197 is connected by the wire 198 to the positive current source wire 177.

The upper terminals of the solenoid windings 99 of the solenoids comprising group B, namely, units 86 to 89, inclusive, are respectively connected to the armatures b1, b2, b3 and b4 of the group B selecting relay B1. The respective associated armature contacts of the selecting relay B1, namely, b5, b6, b7 and b8 are connected to the negative current source wire 191. The coil winding of group selecting relay B1 has one terminal connected to a negative source of current or ground and its other terminal connected by a wire 199 to the lower contact 200 associated with the armature 194. Thus, either the group A or the group B of solenoid units may be selected depending upon whether or not the relay 171 is energized or de-energized.

The upper coil windings 99 of the third group C, units 90 to 93, inclusive, are respectively connected to the armatures c1, c2, c3 and c4 of the group C selecting relay C1. The respective associated armature contacts of the selecting relay C1, namely c5, c6, c7 and c8 are connected in parallel to the negative current source wire 191. The coil winding of group C selector relay C1 has one terminal connected to a negative source of current and its other terminal connected by the wire 201 to the upper contact 202 associated with an armature 203 of relay 171. Armature 203 is connected by a wire 204 to the lower contact 205 of relay 172. When relay 172 is energized, armature 197 engages the lower contact 205 completing a circuit to the positive current wire 177 through conductor wire 198. Assuming relay 171 to be energized, as shown by the dotted line position of armature 203, selector relay C1 is de-energized by the broken contact between armature 203 and contact 202 along wire 201. Relay C1 being de-energized breaks the contacts between the relay armatures c1 to c4 and their associated contacts c5 to c8.

The upper coil windings 99 of the fourth group D, units 94, 95, 96 and 97, inclusive, are respectively connected to the armatures d1, d2, d3 and d4 of the group D selecting relay D1. The respective associated armature contacts of the selecting relay D1, namely, d5, d6, d7 and d8 are connected in parallel to the negative current source wire 191. The coil winding of group selector relay D1 has one terminal connected to a negative source of current and its other terminal connected by a wire 206 to the lower contact 207 associated with the armature 203 of the relay 171. Thus, if relay 171 is energized armature 203 will engage the lower contact 207 completing a circuit through wires 206, 204 and 198, thereby energizing group relay D1.

Each of the relays 168, 169 and 170 has its respective upper terminal, as viewed in Fig. 6A, connected by a wire 208 to the positive current source wire 177. The lower terminal of the winding of relay 168 is connected to the brush or tape finger contact 137 over the wires or conductors 178 and 181 through the contact 180 and armature 179, as disclosed hereinabove. The lower terminal of the winding of the relay 169 is connected to the tape finger contact 138 by a wire 209. Similarly, the lower terminal winding or relay 170 is connected to tape finger contact 139 by a wire 210.

The coil windings of relays 171 and 172 have their respective upper terminals, as seen in Fig. 6A, connected by a wire 211 to the positive current source 177. These two relays, 171 and 172, have their respective lower terminals connected respectively to the tape finger contacts 141 and 140 by wires 212 and 213, respectively. As will be readily apparent, by selective energization of the relays 169 to 172, accompanied by the energization of the relay 168, any one of the upper coil windings 99 of the solenoid units 82 to 97, inclusive, may be energized. Such energization will be in accordance with a code comprising the apertures or perforations 150 in the tape 135 through which the finger contacts 137 to 141 may engage the contact surface of the drum 136.

The relays 173 to 176, inclusive, comprising the one inch value solenoid selecting group, 70 to 81, inclusive, are similarly controlled and wired to selectively control the upper coil windings 99 of these solenoids. These solenoids, 70 to 81, inclusive, are similarly divided into three groups of four solenoids each. Group E comprising solenoids 70 to 73, inclusive; group F comprising solenoids 74 to 77, inclusive, and group G comprising solenoids 78 to 81, inclusive. The upper terminal of the winding of each of the relays 173 to 176, as viewed in Fig. 6A, are similarly connected to the positive source of current 177 by wires 214 and 215. The relay 174 is connected to tape finger 142 by a wire 216. The relay 173 is connected to contact finger 143 by a wire 217. The relay 176 is connected to contat finger 144 by a wire 218, while relay 175 is connected to the contact finger 145 by a wire 219. The relays 173 to 176 may therefore be selectively energized by the apertutres appearing in the coded tape 135 and the respective finger contacts completing a circuit with the surface of the drum 136.

Tape operation

As will be readily apparent from the above description, selection of the one inch value solenoid units 70 to 81 and the sixteenth value solenoid units 82 to 97 is accomplished by providing properly spaced coding of the apertures 150 in the tape 135 for engagement of the surface of the drum 136 by the respective finger contacts 137 to 145.

It will also be apparent that relay 168 becomes de-eneregized whenever a tape feeding pulse is applied to solenoid 153, thereby interrupting the electrtical circuit between the upper coil windings 99 of the solenoid units 70 to 97, inclusive, and the postive terminal current source. As will be seen from Figs. 6A and 6B, the contact 183 associated with solenoid 168 is connected to the contact 126, adjacent the plunger 123, by wire 220. With the plunger 123 in its normal position the band 124 connects contact 126 to contact 125 and to a positive terminal current source through a wire 221.

It will be further apparent that energization of relay 168 also depends upon engagement of contact finger 137 through an aperture 150 in the tape with the conductive surface of the drum 136. In the absence of such an aperture, selection for energization of relay 168 cannot take place. As will readily be understood, it may be desirable to perform other operations before making such selection and which is provided for by the manner in which the tape 135 is coded or perforated.

The switch arm 162 of rotary switch 33 (Fig. 6B) is timed to pulse the tape feed solenoid 153 when the inch selector arm 42 is over the zero position inch-pin element 102 and to again pulse the tape feed solenoid when the inch selector arm 42 has been rotated 180°, in a clockwise direction as viewed in Fig. 2, and is over the solenoid element 102 designated as the six inch position relative to the movement of the carriage 14. By this arrangement a combination may be set up in the relay tree circuit to select and elevate the pins or solenoid plungers 102 required for a given dimension, with respect to the movement of the carriage 14, at a point in the revolution of shaft 31 corresponding to six or more inch pins ahead of the selector arm 42. As explained above, the tape feeding pulses are sent through the contact 159 and armature 157 of the transfer relay 158.

One terminal of the winding of relay 158 is connected by a wire 222 to the drum contact finger 146. The other terminal of the winding of relay 158 is connected by a wire 223 to the upper contact 224 of a relay 225 with the armature 226 thereof normally engaging the stationary contact 224. Armature 226 is connected by a wire 227 to the positive terminal current source. One terminal of relay 225 is connected by a wire 228 to wire 227. The other terminal of relay 225 is connected by a wire 229 to the drum contact finger 147. Thus, since armature 226 and contact 224 are in circuit with the winding of relay 158, relay 158 may be de-energized by energizing the contact finger 147, namely, by providing a code aperture 150 beneath the contact finger 147. With relay 225 de-energized, relay 158 may be energized by providing a code aperture 150 beneath the contact finger 146. Relay 158 is provided with a holding armature 230 engageable with a stationary contact 231 which is connected to the negative terminal of the current source by a wire 232.

The armature 230 is connected to the wire 222, whereby the wire 222 is connected to the negative terminal current source by armature 230 following an initial energization of the relay 158 by the contact finger 146. Such energization is continued until relay 225 becomes energized to open the circuit of relay 158 at the contacts 226, 224.

With the relay 158 energized, armature 157 engages contact 163, whereby the tape feeding solenoid 153 will be pulsed either by the plunger 123 as it descends toward its lowermost position wherein band 127 bridges contacts 128 and 129, or by the rotary switch 118, namely, in response to the return of the carriage 14 to its initial starting position wherein it engages the pawl actuating member 122. Thus, with relay 158 energized, the tape feed solenoid 153 is pulsed each time a punching stroke occurs, whereby to advance the tape 135 to set up the next desired dimension.

As stated above, the plunger 123 is biased downwardly and descends whenever solenoid 132 becomes energized. The solenoid 132 trips the punch press apparatus which moves the plunger 123 downwardly with the action of the punching element. Solenoid 132 has one terminal thereof connected by a wire 233 to the upper contact 234 associated with one of the armatures 235 of a relay 236. Armature 235 is connected by a wire 237 to one armature 238 of a three-pole double-throw relay 239, wherein the armature 238 normally engages an upper contact 240. Contact 240 is connected by a wire 241 to a line wire 242 comprising one of a three-phase alternating current supply source. The remaining terminal of solenoid 132 is connected by a wire 243 to the upper contact 244 of an armature 245 of relay 236, said armature 245 being connected by a wire 246 to one of the armatures 247 of relay 239 and normally engaging an upper contact 248 associated therewith. The contact 248 is connected by a wire 249 to a line wire 250. Thus, solenoid 132, when energized, is connected across two of the wires of a three-phase alternating current supply source.

One terminal of relay 236 is connected by a wire 251 to the negative terminal of the D.C. (direct current) supply source. The other terminal of relay 236 is connected by a wire 252 to one terminal of micro switch 61. The other terminal of micro switch 61 is connected by a wire 253 to the positive terminal of the D.C. source of supply. Thus, when micro switch 61 is opened, at the end of a cycle of selection, as described hereinabove, namely, by the engagement of pin 63 with arm 62, relay 236 becomes de-energized, and releases its armatures 245 and 235, thus causing the energization of solenoid 132 for tripping the punch press apparatus and causing the punching element thereof to descend and causing the plunger 123 to descend therewith.

With the relay 236 energized, armature 245 engages a lower contact 254 of the relay and armature 235 engages a lower contact 255 of the relay, thus connecting a pair of "clutch" and "brake" terminals 256 and 257 across the line wires 250 and 242 by wires 258 and 259, respectively. A "motor" terminal 260 is connected to a line wire 261 of the three-phase current supply through an armature 262 of relay 239 and either the upper contact 263 or the lower contact 264 associated with armature 262, depending upon whether relay 239 is or is not de-energized.

With relay 236 energized, the terminals 256, 257 and 260 are connected to the three-phase current supply wires 250, 242 and 261, respectively, whereby the motor 20 is energized and whereby the clutch 24 associated therewith is held in engaging position to thereby engage the clutch associated therewith. When relay 236 becomes de-energized, by the opening of the micro switch 61, as above described, the terminals 256 and 257 are disconnected from the line wires 250 and 242 causing the clutch to disengage and the brake to be applied.

The direction of movement of carriage 14 may be reversed by reversing the motor 20. Relay 239 is a reversing relay and may be energized to lower its armatures 238, 247 and 262 to engage lower contacts 265, 266 and 264. Thus, one terminal of the winding of relay 239 is connected by a wire 267 to the upper contact 268 of a relay 269. The armature 270 of this relay is connected by a wire 271 to the positive terminal of the D.C. current supply. The remaining terminal of the winding of relay 239 is connected to the drum contact finger 148 by a wire 272. When contact finger 148 passes through an aperture 150 in the tape 135, with relay 269 de-energized, relay 239 is connected across the D.C. current supply and lowers its armatures 238, 247 and 262. An armature 273 of relay 239 engages a contact 274 connected with the D.C. negative terminal source by a wire 275 to establish a holding circuit for the relay 239. Relay 239 can thereafter become de-energized only when relay 269 is energized to cause its armature 270 to disengage from contact 268.

With relay 239 energized terminal 260 remains connected to line wire 261. However, terminal 256 then becomes connected to line wire 242 and terminal 257 becomes connected to line wire 250. This reverses the direction of rotation of motor 20 and causes the carriage 14 to return toward its initial starting position.

To restore the forward motion of the carriage 14 it is necessary to de-energize the relay 239. To accomplish this, relay 269 must be energized. One terminal of the winding of the relay 269 is connected by a wire 276 to the wire 271 completing a circuit to the positive terminal of the D.C. source of supply. The other terminal of relay 269 is connected by a wire 277 to the drum contact finger 149. Therefore, when this flinger 149 passes through an aperture 150 in the tape 135, the relay 269 becomes energized, de-energizing relay 239 restoring armatures 238, 247 and 262 to their normal elevated positions. This restores the forward movement of the carriage 14.

Operations

One typical cycle of operation of the apparatus may be best understood from the following consecutively numbered sequence of steps:

(1) Assume the workpiece and the carriage 14 to be at their respective zero or starting position with relation to the punching element of the punch press.

(2) The line switch, indicated at 280 is closed.

(3) Relay 236 is energized and armatures 235 and 245 engage contacts 254 and 255, respectively.

(4) Motor 20 and clutch 24 are energized.

(5) Rotary switch 33 pulses the tape feed solenoid 153.

(6) Relay 158 becomes energized when the contact finger 146 encounters an aperture in the tape 135.

(7) Rotary switch 33 ceases to furnish pulses to solenoid 153 since armature 157 disengages from its contact 159.

(8) Contact finger 137 and some or none of the contact fingers 138 to 145 encounter apertures in the tape 135.

(9) The upper coil windings 99 of selected solenoid units 70 to 97, inclusive, are energized to elevate their plunger assemblies according to a desired dimensional value calibrated from the zero or starting position of the carriage 14.

(10) Shaft 31 rotates arm 42 which rotates the rotor assembly comprising the disk members 47, 48 and 49 until one of the arms 50 engages the elevated plunger member 102 of one of the solenoid units 82 to 97.

(11) The secondary rotor (annular plate 51) then rotates to cause pin 63 to engage the micro switch arm 62 and open the micro switch.

(12) Relay 236 becomes de-energized, causing the motor 20 and clutch 24 to become de-energized and causing the trip solenoid 132 to be energized by the engagement of armatures 235 and 245 with the contacts 234 and 244, respectively. Energization of the trip solenoid 132 actuates the punch press apparatus causing a hole punching stroke of the punching element and moving the plunger member 123 downwardly therewith.

(13) The band 124 on the plunger 123 unbridges or breaks the circuit between contacts 125 and 126 disconnecting the positive current source to the upper windings 99 of the solenoid units 70 to 97, inclusive. The lower coil windings 100 of the selected solenoids 70 to 97, inclusive, are energized when band 124 bridges the contacts 130 and 131, thus lowering the plunger assemblies previously elevated.

(14) The arms 50 return to their normal positions by the action of the spring 64 and the secondary rotor (member 51) returns to its normal position by the action of the spring 57, thus allowing the micro switch 61 to close and energize the relay 236.

(15) The downward movement of the plunger member 123 causes the band 127 to bridge the contacts 128 and 129, thereby pulsing the tape solenoid 153 and causing the tape 135 to be advanced one step.

(16) When relay 236 becomes energized the motor 20 and clutch 24 resume their normal operation and when the next set of pins (upper portions 102 of the solenoid units 70 to 97) are elevated by contact finger 137, and selected ones of the contact fingers 137 to 145, another punching operation is obtained when the micro switch 61 is again opened as described in steps 10 and 11.

(17) A predetermined number of punching cycles are performed on the workpiece in accordance with the coding of the apertures 150 on the tape 135.

(18) At the end of a series of punching operations relay 225 becomes energized by drum contact finger 147 if the next dimension requires more than one revolution of the selector arm 42.

(19) The rotary switch 33 again pulses the tape feed solenoid 153.

(20) The carriage 14 is automatically returned towards its zero or starting position when relay 239 becomes energized responsive to the engagement of the contact finger 148 through an aperture 150 in tape 135, thus relay 239 is locked in its holding circuit which includes its armature 273 and contact 274 and the normally closed contacts 268 and 270 of relay 269. This reverses the motor 20.

(21) When the carriage 14 and the workpiece have been returned to their zero or starting positions the automatic action is stopped as by applying the brake 25 or turning off the current, and the punch press stem or punching element of the machine tool is adjusted transversely of the longitudinal axis of the workpiece to properly position the punching element for the next series of holes to be punched, which may or may not be the same coding as used in punching the first series of holes. In some instances, or with some types of machine tools with which the instant invention is associated, it may be more desirable to move the workpiece rather than move the machine tool head.

(22) With the brake 25 released and the main switch 280 remaining closed the tape 135 is advanced by the action of switch 118 which has been tripped by the carriage 14 as it returned to its zero position and engaged the actuating pawl 122 of switch 118. Advancing the tape 135 positions an aperture 150 under contact finger 149 which energizes relay 269, and releases its armature 270 from contact 268 thus de-energizing relay 239, which is a reversing switch, and releasing armature 273 from contact 274.

(23) The forward motion of the motor 20 is resumed when relay 269 becomes energized and releases relay 239 by the engagement of contact finger 149 through an aperture 150 in the tape 135.

(24) The above described cycle of operations is then repeated.

The band 127, on the plunger 123, is preferably spaced a suitable distance from the band 124 so that the band 127 engages contacts 128 and 129 shortly after the band 124 bridges the contacts 130 and 131 so that the tape 135 will be advanced shortly after the elevated solenoid plunger pins 102 are cleared.

A suitable multiple-connector plug assembly 285 is employed to connect the electrical terminals of the components of the selector unit 32 to a cable 286 connected to the relay assembly bank 36.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An electro-mechanical selector mechanism, including: a horizontally disposed base; a vertical shaft rotatably carried by said base, said shaft extending above and below said base; a driven shaft connected with said vertical shaft; motor means drivably connected to said driven shaft; a first arm secured to said vertical shaft in spaced parallel relation above said base; a first rotor assembly rotatably carried by said vertical shaft between said base and said first arm; a plurality of solenoids mounted on said first rotor assembly around said vertical shaft, each of said solenoids having plunger assemblies capable of being elevated into the path of rotation of said first arm responsive to the energization of said solenoids; at least one second arm carried by said first rotor assembly and extending outward radially from said shaft in spaced parallel relation above said base; a second rotor assembly rotatably carried by said base, said second rotor assembly being movable independently of said first rotor assembly; a plurality of solenoids mounted on said second rotor assembly around said first rotor assembly, said last named solenoids having plunger assemblies capable of being elevated into the path of rotation of said second arm responsive to the energization of said last named solenoids; an electric relay circuit connected to said solenoids and being formed and arranged to energize selected ones of said solenoids for elevating the plunger assemblies thereof whereby said first and said second arms engage the elevated plungers for stopping the rotation of said driven shaft at selected angular positions and simultaneously rotating said second rotor assembly; and electric circuit means de-energizing said motor means responsive to the rotation of said second rotor assembly.

2. An electro-mechanical selector mechanism for controlling the movement of a workpiece with respect to a machine tool, including: a horizontally disposed base; a vertical shaft rotatably carried by said base, said shaft extending above and below said base; a driven shaft connected with said vertical shaft; motor means drivably connected to said driven shaft; a primary arm secured to said vertical shaft in spaced parallel relation above said base; a first rotor assembly rotatably carried by said vertical shaft between said base and said primary arm; a plurality of solenoid units mounted on said first rotor assembly around said vertical shaft, each of said solenoid units having plunger assemblies capable of being elevated into the path of rotation of said primary arm responsive to the energization of said solenoid units; a plurality of secondary arms carried by said first rotor assembly and extending radially outwardly from said shaft in spaced parallel relation above said base; a second rotor assembly rotatably carried by said base, said second rotor assembly being movable independently of said first rotor assembly; a plurality of solenoids mounted on said second rotor assembly around said first rotor assembly, said last named solenoids having plunger assemblies capable of being elevated into the path of rotations of said secondary arms responsive to the energization of said last-named solenoids; an electric relay circuit connected to said solenoids and being formed and arranged to energize selected ones of said solenoids for elevating the plunger assemblies thereof whereby said primary arm and said secondary arms will engage the elevated plungers for stopping the rotation of said vertical shaft and said driven shaft at selected angular positions and simultaneously rotating said second rotor assembly; and electric circuit means formed and arranged for de-energizing said motor means responsive to the rotation of said second rotor assembly.

3. A work-positioning apparatus, including: a table; a carriage movably mounted on said table, said carriage adapted to support a workpiece; drive means coupled to said carriage; a positioning shaft coupled to said carriage; a support rotatably receiving said positioning shaft therethrough; a first arm secured to said positioning shaft; a first rotor assembly rotatably mounted on said support around said shaft; a plurality of solenoids mounted on said rotor assembly around said shaft; plunger elements in said solenoids and being formed and arranged to be elevated into the path of movement of said first arm responsive to energization of said solenoids; a second arm on said rotor assembly; a second rotor assembly rotatably mounted on said support; solenoids mounted on said second rotor assembly; plungers in said second-named solenoids formed and arranged to be elevated into the path of movement of said second arm responsive to energization of said second-named solenoids; means formed and arranged to yieldably lock said plungers in elevated positions; means de-energizing said solenoids responsive to the elevation of their plungers; a selecting circuit connected to said solenoids and being formed and arranged to selectively energize said solenoids, whereby said first arm and said second arm engage the plungers of selected solenoids on said first and second rotor assemblies, acting to rotate said second rotor assembly; and means de-energizing said drive means responsive to the rotation of said second rotor assembly.

4. A work-positioning apparatus of the character described, including: a table; a carriage movably mounted on said table, said carriage adapted to move a workpiece; drive means coupled to said carriage, said drive means including an electric motor; a vertical positioning shaft coupled to said carriage; a horizontal support base rotatably receiving said vertical positioning shaft therethrough; a primary arm secured to the upper end of said vertical positioning shaft parallel with said base; a first rotor assembly rotatably mounted around said vertical shaft between said primary arm and said base; a plurality of solenoids mounted on said first rotor assembly around said shaft, said solenoids having plunger elements capable of being elevated into the path of movement of said primary arm responsive to the energization of said solenoids; a secondary arm on said first rotor assembly; a second rotor assembly rotatably mounted on said support base; solenoids mounted on said second rotor assembly, said last named solenoids having plunger elements capable of being elevated into the path of movement of said secondary arm responsive to energization of the second-named solenoids; means formed and arranged to yieldably lock said plunger elements in elevated positions; means de-energizing said solenoids responsive to the elevation of their plungers; a selecting circuit connected to said solenoids and being formed and arranged to selectively energize the latter, whereby said primary arm and said secondary arm engage the elevated plungers of selected solenoids on said first and second rotor assemblies, acting to rotate said second rotor assembly; means de-energizing said drive means responsive to the rotation of said second rotor assembly; a reciprocating switch member; means causing said switch member to move simultaneously with the de-energization of said drive means; and electric circuit means formed and arranged to lower the plungers of the selected solenoids responsive to the movement of said switch member.

5. A work-positioning apparatus of the character described, including: a table; a carriage movably mounted on said table, said carriage adapted to move a workpiece; drive means coupled to said carriage; a vertical positioning shaft coupled to said carriage; a support base rotatably receiving said vertical positioning shaft therethrough; a primary arm secured to said vertical positioning shaft in parallel relation above said support base; a first rotor assembly rotatably mounted on said vertical shaft between said base and said primary arm; a plurality of solenoids mounted on said first rotor assembly around said vertical shaft, said solenoids having plunger elements capable of being elevated into the path of rotation of said primary arm responsive to energization of said solenoids; a plurality of secondary arms radially carried by said first rotor assembly; a second rotor assembly rotatably mounted on said support base around said first rotor assembly; solenoids mounted on said second rotor assembly, said second-named solenoids having plunger elements capable of being elevated into the path of rotation of said secondary arms responsive to energization of said second-named solenoids, a source of electrical current; electric relay means formed and arranged to selectively energize said solenoids from said source of current; a perforated movable code tape; contact means co-operatively aligned with the perforations of said tape; an energizing circuit including said contact means and formed and arranged to control said relay means in accordance with the arrangement of the perforations on said tape; feed means for intermittently advancing said tape relative to said contact means, whereby said primary and said secondary arms engage the elevated plungers of selected solenoids on said first and second rotor assemblies, acting to rotate said second rotor assembly; means de-energizing said drive means responsive to the rotation of said second rotor assembly; and means actuating said feed means shortly after said drive means becomes de-energized.

6. A work-positioning apparatus for progressively moving a workpiece toward a machine tool, including: a support table; a carriage movably mounted on said table, said carriage adapted to support a workpiece; drive means coupled to said carriage; a vertical positioning shaft coupled to said carriage through said drive means; a horizontal support base rotatably receiving said vertical positioning shaft therethrough; a primary arm secured to said vertical positioning shaft in parallel relation above said support base; a first rotor assembly rotatably mounted around said vertical shaft between said base and said primary arm; a plurality of solenoids mounted on said first rotor assembly around said vertical shaft, said solenoids having plunger elements capable of being elevated into the path of rotation of said primary arm responsive to energization of said solenoids; a plurality of secondary arms radially carried by said first rotor assembly; a second rotor assembly rotatably mounted on said support base around said first rotor assembly; solenoids mounted on said second rotor assembly, said second-named solenoids having plunger elements capable of being elevated into the path of rotation of said secondary arms responsive to energization of said second-named solenoids; means formed and arranged to yieldably lock said plunger elements in elevated position; means de-energizing said solenoids responsive to the elevation of their plunger elements; a source of electric current; relay means formed and arranged to selectively energize said solenoids from said current source; a perforated movable code tape; contact means co-operatively aligned with the perforations of said tape; an energizing circuit including said contact means and formed and arranged to control said relay means in accordance with the arrangement of the perforations in said tape; feed means for intermittently advancing said tape relative to said contact means, whereby said primary arm and said secondary arms engage the elevated plunger elements of selected solenoids on said first and second rotor assemblies, acting to rotate said second rotor assembly; means de-energizing said drive means responsive to the rotation of said second rotor assembly; a reciprocating switch member; means causing said switch member to move simultaneously with the de-energization of said drive means; means formed and arranged to lower the plunger elements of the selected solenoids responsive to the movement of said switch member; and means actuating said feed means responsive to the movement of said switch member.

7. An electro-mechanical selector apparatus for controlling the movement of a workpiece with respect to a machine tool, including: a supporting table; a carriage movably mounted on said table, said carriage adapted to move a workpiece; drive means coupled to said carriage; a vertical positioning shaft coupled to said carriage through said drive means; a horizontal support base rotatably receiving said vertical positioning shaft therethrough; a primary arm secured to said vertical positioning shaft in parallel relation above said base; a first rotor assembly rotatably mounted around said shaft between said support base and said primary arm; a plurality of solenoids mounted on said first rotor assembly around said shaft, said solenoids having plunger elements capable of being elevated into the path of rotation of said primary arm responsive to energization of said solenoids; a plurality of secondary arms radially carried by said first rotor assembly; a second rotor assembly rotatably mounted on said support base around said first rotor assembly; solenoids mounted on said second rotor assembly, said second-named solenoids having plunger elements capable of being elevated into the path of rotation of said secondary arms responsive to energization of said second-named solenoids; means formed and arranged to yieldably lock said plunger elements in elevated positions; means de-energizing said solenoids responsive to the elevation of their plunger elements; a source of electric current; relay means formed and arranged to selectively energize said solenoids from said electric source, whereby said primary arm and said secondary arms engage the elevated plunger elements of selected solenoids on said first and second rotor assemblies, acting to rotate said second rotor assembly; a perforated movable code tape; contact means co-operatively aligned with the perforations of said tape; an energizing circuit including said contact means and being formed and arranged to control said relay means in accordance with the arrangement of the perforations in said tape; feed means for initermittently advancing said tape relative to said contact means; means de-energizing said drive means responsive to the rotation of said second rotor assembly; a reciprocating switch member; means causing said switch member to move simultaneously with the de-energization of said drive means; means formed and arranged to lower the elevated plunger elements of the selected solenoids responsive to the movement of said switch member; means actuating said feed means responsive to the movement of said switch member; and means formed and arranged to at times intermittently actuate said feed means independently of said switch member.

8. An electro-mechanical apparatus of the character described, including: a supporting table; a carriage movably mounted on said table; drive means coupled to said carriage; a vertical positioning shaft coupled to said carriage through said drive means; a horizontal support base rotatably receiving said vertical positioning shaft therethrough; a primary arm secured to said vertical positioning shaft in parallel relation above said base; a first rotor assembly rotatably mounted around said shaft between said support base and said primary arm; a plurality of solenoids mounted on said first rotor assembly around said shaft, said solenoids having plunger elements capable of being elevated into the path of rotation of said primary arm responsive to energization of said solenoids; a plurality of secondary arms radially carried by said first rotor assembly; a second rotor assembly rotatably mounted on said support base around said first rotor assembly; solenoids mounted on said second rotor assembly, said second-named solenoids having plunger elements capable of being elevated into the path of rotation of said secondary arms responsive to energization of said second-named solenoids; means formed and arranged to yieldably lock said plunger elements in elevated positions; means de-energizing said solenoids responsive to the elevation of their plungers; a source of electric current; relay means formed and arranged to selectively energize said solenoids from said electric source, whereby said primary arm and said secondary arms engage the elevated plunger elements of selected solenoids on said first and second rotor assemblies, acting to rotate said second rotor assembly; a perforated movable code tape; contact means co-operatively aligned with the perforations of said tape; an energizing circuit including said contact means and formed and arranged to control said relay means in accordance with the arrangement of the perforations in said tape; feed means for intermittently advancing said tape relative to said contact means; means de-energizing said drive means responsive to the rotation of said second rotor assembly; a reciprocating switch member; means causing said switch member to move simultaneously with the de-energization of said drive means; means formed and arranged to lower the plungers of the selected solenoids responsive to the movement of said switch member; means actuating said feed means responsive to the movement of said switch member; means formed and arranged to at times intermittently actuate said feed means independently of said switch member; and means controlled by said code tape and formed and arranged to at other times reverse the direction of said drive means.

9. Structure as specified in claim 8, in which the drive means includes a horizontally disposed driven shaft; a gear train connected to said shaft; a reversible electric motor; and an electro-mechanical clutch connecting said motor to said gear train.

References Cited in the file of this patent
UNITED STATES PATENTS

| | | |
|---|---|---|
| 531,701 | Smith | Jan. 18, 1895 |
| 1,241,265 | Frelinghuysen | Sept. 25, 1917 |
| 1,241,266 | Wurts | Sept. 25, 1917 |